UNITED STATES PATENT OFFICE.

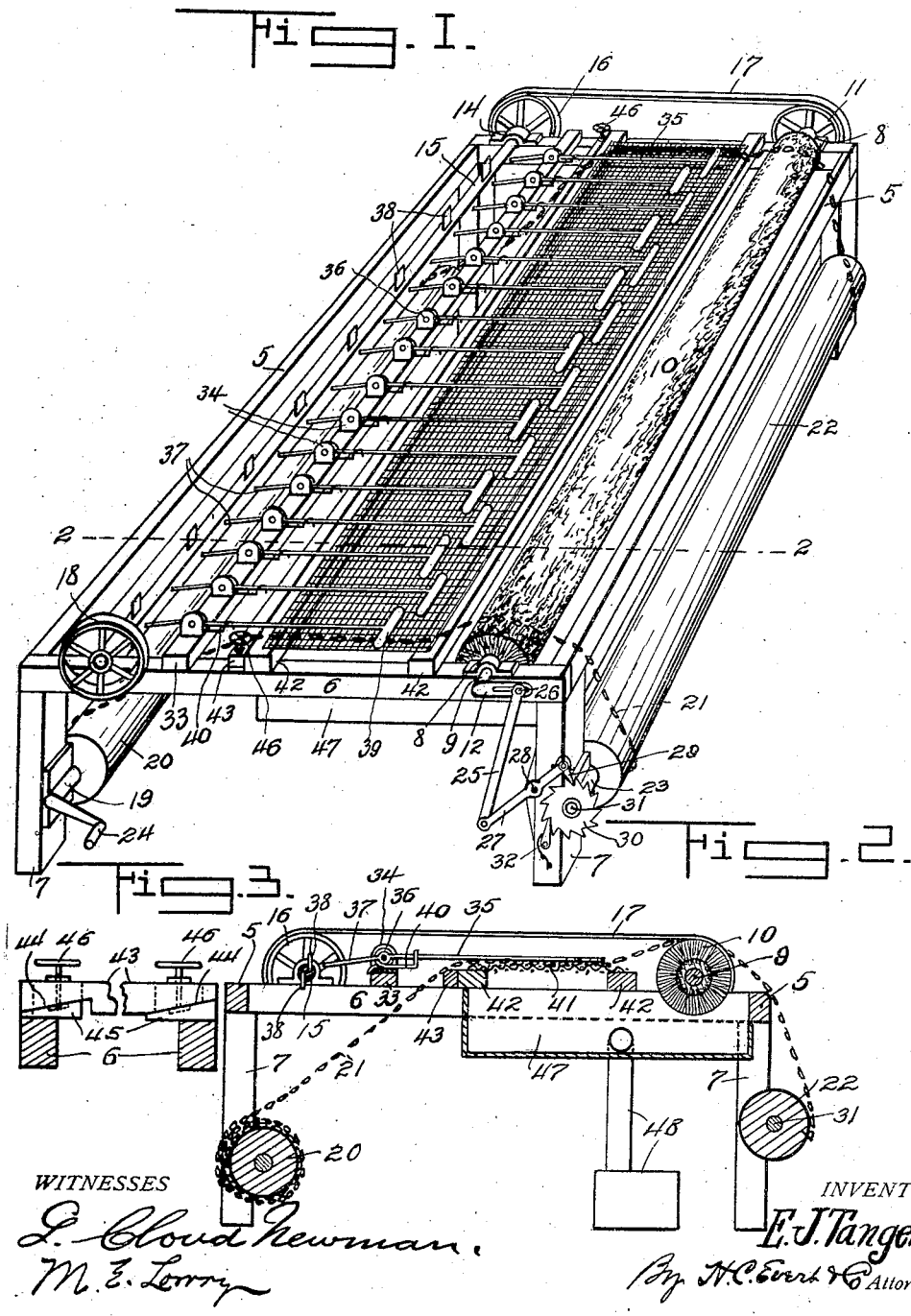

ELDO J. TANGEMAN, OF KEYSTONE, IOWA.

CARPET-CLEANER.

1,042,054.  Specification of Letters Patent.  Patented Oct. 22, 1912.

Application filed November 23, 1911. Serial No. 661,919.

*To all whom it may concern:*

Be it known that I, ELDO J. TANGEMAN, a citizen of the United States, and residing at Keystone, in the county of Benton and State of Iowa, have invented certain new and useful Improvements in Carpet-Cleaners, of which the following is a specification.

This invention relates to certain new and useful improvements in carpet cleaners, and has for its object to provide novel and effective means for cleaning carpet as it is passed through the cleaner and collecting the dust or dirt removed therefrom by the cleaner and conducting the same away from the collecting receptacle.

Further objects of the invention will hereinafter appear as the invention is more fully described and particularly claimed, and in describing the invention in detail, reference will be had to the accompanying drawing forming a part of this specification, and wherein like numerals of reference will be employed throughout the different views to indicate like parts.

In the drawings: Figure 1 is a perspective view of a carpet cleaning machine in accordance with my invention. Fig. 2 is a transverse vertical sectional view on the line 2—2 of Fig. 1, and Fig. 3 is a detail view partly in side elevation, partly broken away and partly in section, showing the adjusting mechanism for the tension bar.

To put my invention into practice, I provide a supporting frame which embodies side rails 5, end rails 6 and supporting legs or standards 7.

The end rails 6 near the forward ends thereof are provided with bearings 8, in which is journaled a shaft 9 carrying a rotary brush 10. On one end of the shaft 9 is a pulley wheel 11, and on the other end of said shaft is a slotted crank 12. On the rails 6 near their rear ends are bearings 14, similar to the bearings 8, and in these bearings is journaled an actuating shaft 15, provided on one end outside of the frame with a pulley wheel 16, which together with the pulley wheel 11 receives a belt 17 whereby the brush 10 is rotated as the shaft 15 is rotated. On the other end of said shaft 15 is a pulley wheel 18 that receives a drive belt (not shown).

The rear legs of the frame carry bearings 19, in which is journaled the shaft of a carpet receiving roll 20. The carpet, indicated in dotted lines and designated 21 is wound upon the roll 20 and fed through the machine, being received at the front of the machine on a roll 22 carried by a shaft which is journaled in bearings 23 similar to the bearings 19, and which bearings 23 are secured to the front legs 7. The shaft of the roll 20 is provided on one end with a suitable crank 24 by means of which the roll may be revolved to wind the carpet to be cleaned thereon.

The roll 22 is revolved as the carpet is passed through the machine by means of mechanism including the slotted link 12 actuated by the shaft 9. This mechanism comprises a link 25 having at its upper end a pin 26 which works in the slot of the link 9. The lower end of said link 25 is pivotally connected to one end of a lever 27 pivotally supported as at 28 from one of the front legs of the frame and having at the free end of its shorter arm a pawl 29 which engages a ratchet wheel 30 mounted on one end of the shaft 31 that carries the roll 22. This roll 22 is held against backward rotation by means of a spring-pressed pawl 32 carried by the front leg of the frame which carires the lever 27.

Mounted on the end rails 6 is a beater arm supporting bar 33 having mounted thereon at spaced intervals throughout supporting lugs 34, in which the beater arms 35 are pivotally-mounted as at 36. These beater arms are supported at a point closer to their rear ends than to their front ends, the rearwardly-projecting portions 37 of the arms extending to a point in close proximity to the shaft 15, where they will be engaged by the lugs or strikers 38 arranged on said shaft 15, one for each beater arm. These lugs or strikers are disposed on the shaft 15 in alternating relation, that is, one half of the lugs or strikers are on one side of the shaft and the other half of the lugs or strikers are on the opposite side of the shaft, so that one half of the whole number of beater arms employed are engaged by the strikers in each half revolution of the shaft. The beater arms are preferably provided with heads as 39 at their forward ends, which may be T-shaped as shown or of any other suitable form. The beater arms are caused to forcibly strike the carpet as the latter is drawn through the machine by means of springs 40 shown best in detail in Fig. 2 of the drawings.

The carpet in its travel through the machine passes over a mesh or screen 41, mounted on a pair of supporting bars 42 carried by the end rails 6. In order to provide for increasing or diminishing the force with which the beater arms are allowed to strike the carpet, I provide an adjusting bar 43. This bar in its lowered position as shown in Fig. 2 lies entirely below the beater arms, so that the latter may strike the carpet with the full force that may be imparted thereto by the springs 40. In case however, it is desired to decrease the force with which the beater arms may be allowed to strike the carpet, the bar 43 may be adjusted in any suitable manner so as to elevate the same and thus take the force of the blow as the beater arms descend. Any suitable means of adjustment may be employed, that herein shown embodying the bar 43 provided near the ends with inclined faces 44 which work on the inclined faces of blocks 45 carried by the end rails 6. Obviously, if the bar 43 as illustrated in Fig. 3 be moved toward the right, it will be elevated throughout its length so as to approach the beater arms 35, where it may be secured in the adjusted position as by set screws 46, or in any other suitable manner. Underneath the screen or mesh 41 is a dust collecting pan 47, with which I connect either at the end or at any suitable point, a suction device 48 so as to draw off the dust as it is received in the pan.

The carpet to be cleaned is rolled upon the roll 20, with the free edge thereof passed underneath bar 33 over bar 43 and over the screen or mesh 41, over the rotary brush 10 and has its end connected in any desirable manner to roll 22. Obviously now, when the shaft 15 is revolved, motion will also be imparted to the rotary brush 10 and roll 22, and the beater arms being engaged by the strikers 38 will have their forward ends elevated until the strikers pass out of engagement with the arms, when the springs 40 will cause the beater arms to forcibly strike the carpet. The latter is passed through the cleaner with the nap side down, so that the dirt will readily fall out of the same, and as the carpet passes over the revolving brush 22, any loose particles of dirt or dust are removed, and the nap also straightened out, so that the carpet is rewound on roll 22 in a cleaned condition.

What I claim is:—

In a carpet cleaning machine, a supporting frame, an actuating shaft at the rear of the frame, a carpet receiving roll at the rear of the frame, a carpet winding roll at the front of the frame, a screen mounted on top of the frame and over which the carpet travels as it passes from the receiving roll to the winding roll, a series of spring-pressed beater-arms mounted on the frame, strikers carried by the actuating shaft to engage said arms, a bar mounted on said frame beneath the beater arms and adjustable toward and away from said arms to regulate the stroke of the arms upon the carpet, a rotary brush at the front of the frame over which the carpet passes in its travel, driving means connecting the shaft of the rotary brush to the actuating shaft, and means for actuating the winding roll from the shaft of the rotary brush.

In testimony whereof I affix my signature in presence of two witnesses.

ELDO J. TANGEMAN.

Witnesses:
J. H. ROZEMA,
W. C. HAMANN.

---

Copies of this patent may be obtained for five cents each, by addressing the "Commissioner of Patents, Washington, D. C."